(12) United States Patent
Aota et al.

(10) Patent No.: US 6,428,236 B2
(45) Date of Patent: Aug. 6, 2002

(54) EXPANSION SHAFT

(75) Inventors: Kenichi Aota, Nara; Takayoshi Hashimoto, Kashiwara; Junya Watanabe, Yao; Shuuzou Hirakushi, Nara, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/726,326

(22) Filed: Dec. 1, 2000

(30) Foreign Application Priority Data

Dec. 2, 1999 (JP) .......................................... 11-343700
Nov. 17, 2000 (JP) ....................................... 2000-350738

(51) Int. Cl.$^7$ ................................................. F16B 3/04
(52) U.S. Cl. ............................... 403/359.5; 403/359.6; 74/496
(58) Field of Search ........................ 403/359.5, 359.6, 403/359.1, 356, 357; 74/496, 492; 280/777

(56) References Cited

U.S. PATENT DOCUMENTS

| | | | | |
|---|---|---|---|---|
| 3,964,833 A | * | 6/1976 | Manriquez ................... | 403/357 |
| 4,628,758 A | * | 12/1986 | Yuzuriha et al. .............. | 74/498 |
| 5,640,884 A | * | 6/1997 | Fujiu et al. .................... | 74/492 |
| 5,674,026 A | * | 10/1997 | Ishibashi et al. ......... | 403/359.5 |
| 6,241,616 B1 | * | 6/2001 | Lightcap .............. | 403/359.5 X |
| 6,257,798 B1 | * | 7/2001 | Wormsbaecher ......... | 403/359.5 |

FOREIGN PATENT DOCUMENTS

JP        7-40360        7/1995

\* cited by examiner

Primary Examiner—Lynne H. Browne
Assistant Examiner—John R. Cottingham
(74) Attorney, Agent, or Firm—Rabin & Berdo, P.C.

(57) ABSTRACT

An expansion shaft includes a first and a second shaft section aligned on the same axis. The second shaft section is inserted in a fit hole of the first shaft section while both the shaft sections are interconnected via a spline or serration. A resilient member is provided which possesses a single snap ring of C-shape fitted on a thin shaft portion of the second shaft section. An arm is axially extended from the snap ring. The arm resiliently presses against an inner circumferential surface of the fit hole for preventing the shaft sections from radially vibrating relative to each other.

18 Claims, 9 Drawing Sheets

EXPANSION SHAFT

CROSS REFERENCE TO RELATED APPLICATION

This application claims the benefit under 35 U.S.C. § 119 of Japanese Patent Application Nos. 11-343700 and 2000-350738, the abstract of disclosure of which is incorporated herein by reference.

BACKGROUND OF THE INVENTION

The present invention relates to an expansion shaft. More particularly, the invention is directed to an improved structure of the expansion shaft for preventing vibrations resulting from play in fit portions of a pair of shaft sections.

DESCRIPTION OF RELATED ART

The expansion shaft is used as, for example, a steering shaft of an automobile.

The expansion shaft is also used as an intermediate shaft interconnecting the automotive steering shaft and a steering mechanism such as a rack and pinion type mechanism. In this case, the extending function is used for adjustment of the intermediate shaft length for accommodating a relative displacement between a steering gear and a steering column while a vehicle is driven, or used for adjustment of the length of the intermediate shaft at the time of being assembled.

A spline or serration is generally employed as a structure for establishing fitting engagement between the pair of shaft sections of the expansion shaft.

For instance, the two shaft sections may be integrally rotatably joined together by inserting an end of a second shaft section into a fit hole formed at an end of a first shaft section. The fit hole includes a female serration (also called an internal serration) while the end of the second shaft section includes a male serration (also called an external serration).

In this case, the second shaft section cannot be inserted into the fit hole if there is no clearance between the male serration and the female serration. Unfortunately, the clearance has the adverse effect of permitting the shaft sections to be radially or circumferentially displaced relative to each other, thus causing rattle which is annoying to a driver.

For this reason, the second shaft section is configured such that a part of the male serration is cut away to produce a cutaway portion or to define a D-shape in section. With a flat plate spring of a bent form placed on the cutaway portion, the second shaft section is fitted in the fit hole of the first shaft section thereby preventing the occurrence of rattle.

However, the configuration suffers a poor assemblability because of a fear that the plate spring on the cutaway portion of the second shaft section may move out of place when the second shaft section is inserted in the fit hole of the first shaft section. In some cases, the second shaft section may be assembled with the plate spring displaced out of place. This leads to the variations of an anti-rattle effect.

Figure 8:
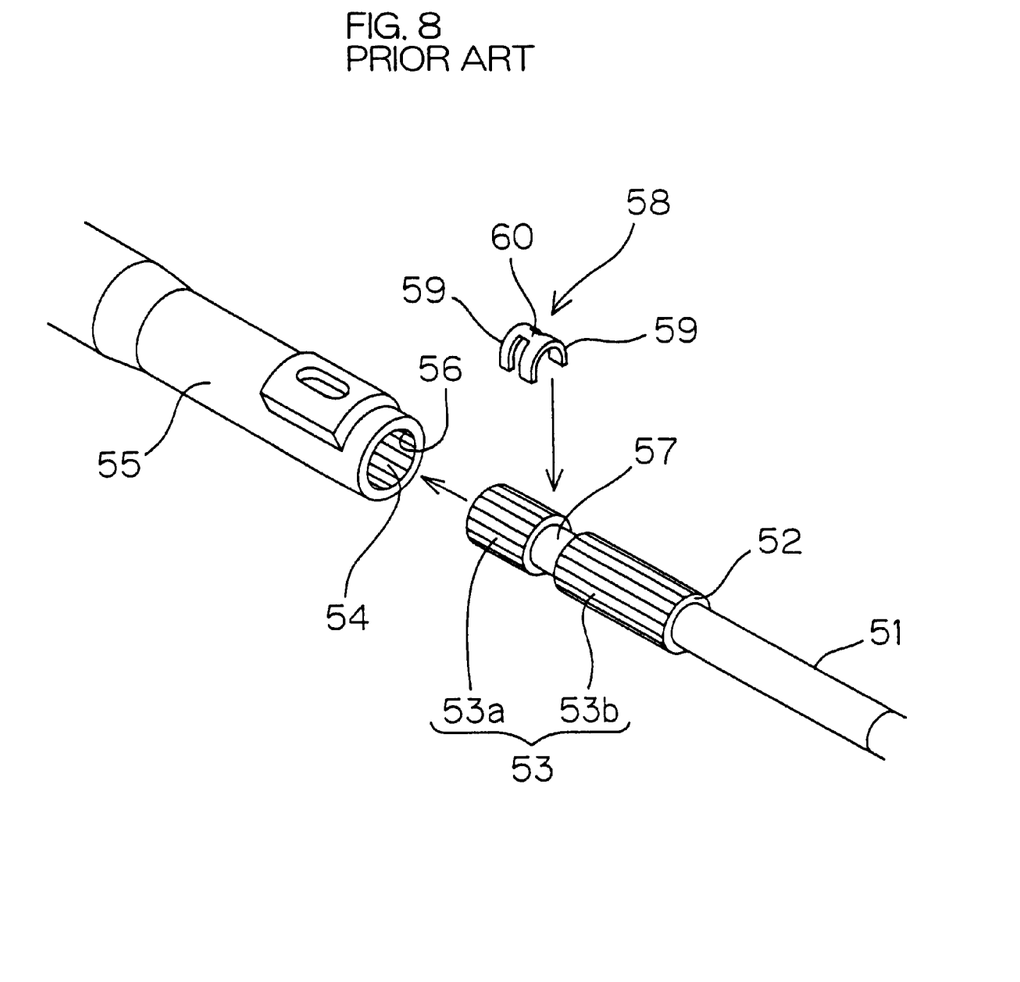
FIG. 8 is an exploded perspective view showing a conventional expansion shaft.

As an approach to overcome this problem, an anti-rattle member as shown in FIG. 8 has heretofor been proposed (Unexamined Japanese Utility Model No.7(1995)-40360). The anti-rattle member is arranged such that one shaft section 51 is formed with a thick shaft portion 52 at an end thereof, which is formed with a male serration 53, while a female serration 54 for fittingly receiving the male serration 53 is formed at an inner circumferential surface of a fit hole 56 of the other shaft section 55. The male serration 53 includes a first portion 53a and a second portion 53b which are axially separated from each other. A thin shaft portion 57 is defined between the first and second portions 53a, 53b and is adapted to be brought into fitting engagement with an anti-rattle member 58.

Figure 9A:
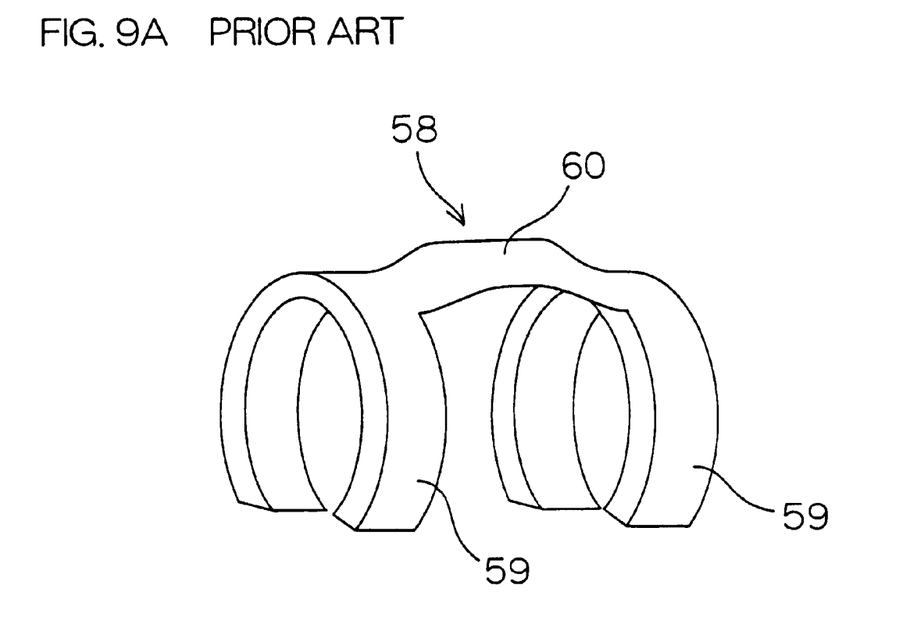
FIGS. 9A and 9B are a perspective view and a plan view showing an anti-rattle member employed by the expansion shaft of FIG. 8.
Figure 9B:
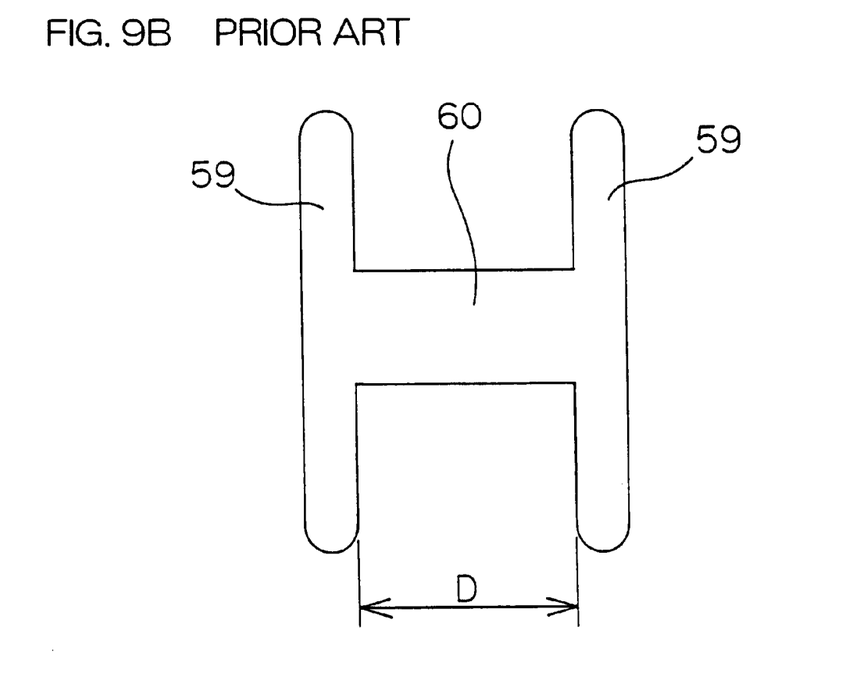

Referring to FIGS. 8 and 9A–9B, the anti-rattle member 58 includes two legs 59 substantially of an annular shape (C-shape) having a smaller inside diameter than an outside diameter of the thin shaft portion, and a body 60 interconnecting these legs 59 at their mid portions.

When the one shaft section 51 is inserted in the fit hole 56 of the other shaft section 55, the anti-rattle member 58 is stably retained on the one shaft section 51 by way of the legs 59 resiliently clamping the thin shaft portion 57. This eliminates a fear of disengagement of the anti-rattle member 58 during assembly.

The body 60 is of a bent shape raised at its intermediate portion. The body is designed to prevent the occurrence of rattle by way of its top portion resiliently pressing against the female serration 54.

However, the thin shaft portion 57 is increased in the axial length because of the anti-rattle member 58 having the pair of legs 59, 59 axially spaced from each other by a distance D. As a result, the male serration 53 is increased in the overall axial length. Hence, a fit length between the pair of shaft sections 51, 55 is increased so that the overall weight and costs of the expansion shaft increase.

SUMMARY OF THE INVENTION

In view of the foregoing, it is an object of the invention to provide an expansion shaft capable of achieving the reduction of size and weight.

In accordance with a preferred aspect of the invention for achieving the above object, an expansion shaft comprises a first and a second shaft section aligned on the same axis, the expansion shaft further comprising a fit hole formed at the first shaft section for receiving the second shaft section; a thin shaft portion defined on the second shaft section; a pair of thick shaft portions formed on the second shaft section as axially sandwiching the thin shaft portion therebetween; a groove and a ridge respectively formed in an inner circumferential surface of the fit hole and on the thick shaft portions for coming into fitting engagement thereby integrally rotatably interconnecting the first and second shaft sections as allowing the shaft sections to axially move relative to each other; and a resilient member interposed between the inner circumferential surface of the fit hole of the first shaft section and an opposite outer peripheral surface of the second shaft section for preventing the shaft sections from radially moving relative to each other. The resilient member includes a single C-shaped snap ring resiliently clamping the thin shaft portion, and an arm extended from the snap ring in at least one axial direction of the second shaft section and serving to press against the inner circumferential surface of the fit hole of the first shaft section.

According to the embodiment, the single C-shaped snap ring is used for retaining the resilient member on the thin shaft portion of the second shaft section so that the thin shaft portion can be reduced in the axial length. This contributes to the reduction of the fit length between the first and second shaft sections, thus enabling the realization of a compact, lightweight expansion shaft. In addition, the arm resiliently presses against the inner circumferential surface of the fit hole of the first shaft section thereby positively preventing the vibrations due to a loose fit between the first and second shaft sections as well as the occurrence of noise associated with the vibrations.

DETAILED DESCRIPTION OF THE PREFERRED EMBODIMENTS

Now, preferred embodiments of the invention will be described with reference to the accompanying drawings. Referring to FIGS. 1–4, an expansion shaft according to one embodiment of the invention will be described.

Figure 1:
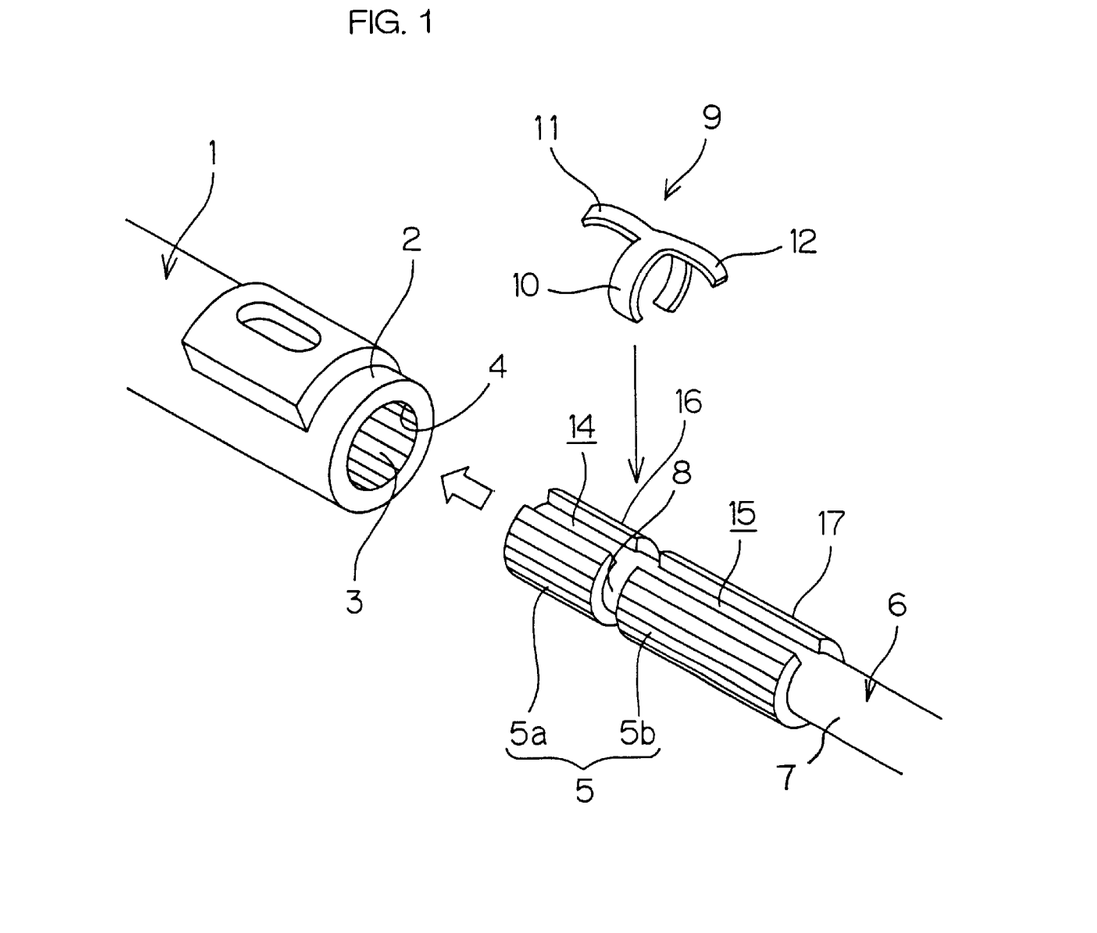
FIG. 1 is an exploded perspective view showing an expansion shaft according to one embodiment of the invention.

As seen in FIG. 1, the expansion shaft is constructed such that a fit hole 4 with a female serration 3 is formed at an end 2 of a first shaft section 1 while an end 7 of a second shaft section 6 is inserted in the fit hole 4, the end 7 of the second shaft section 6 having a male serration 5 to engage with the female serration 3.

The end 7 of the second shaft section 6 includes a thin shaft portion 8 having a smaller diameter and a predetermined width, and a pair of thick shaft portions 16, 17 of a greater diameter axially sandwiching the thin shaft portion 8 therebetween. The thick shaft portions 16, 17 are respectively formed with a male serration 5a, 5b at their outer peripheries. That is, the male serration 5 is divided into the two male serrations 5a, 5b disposed on axially opposite sides of the thin shaft portion 8. FIG. 1 schematically shows the male serrations 5a, 5b and the female serration 3. An anti-rattle member 9 formed of a resilient member is mounted on the thin shaft portion 8. The anti-rattle member 9 is constructed from a sheet metal by press forming.

Figure 2:
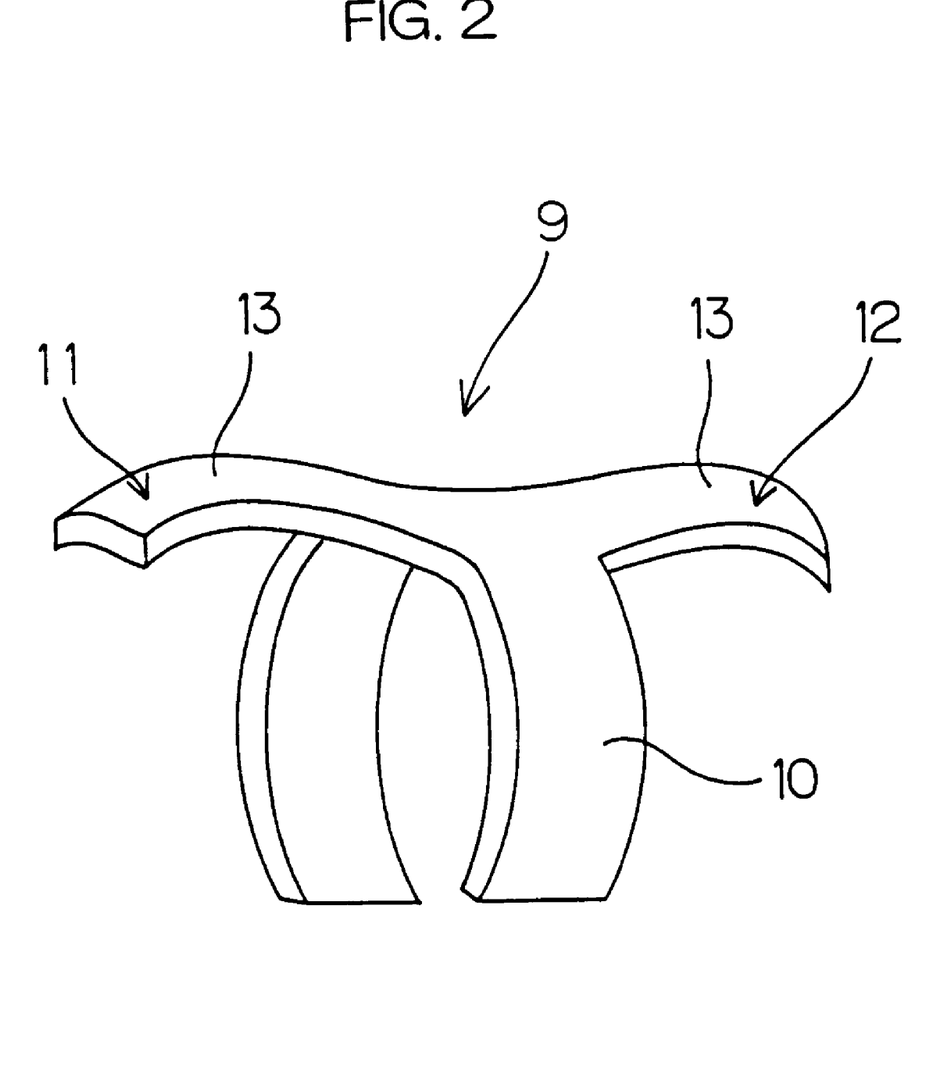
FIG. 2 is a perspective view showing an anti-rattle member.
Figure 3A:
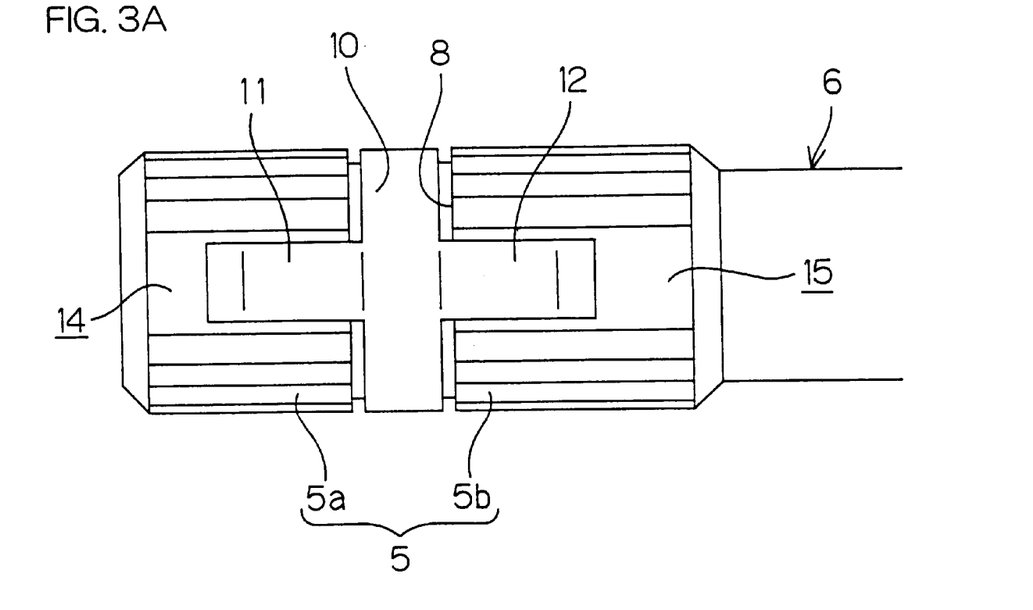
FIGS. 3A and 3B are a plan view and a side view showing the anti-rattle member attached to a second shaft section.
Figure 3B:
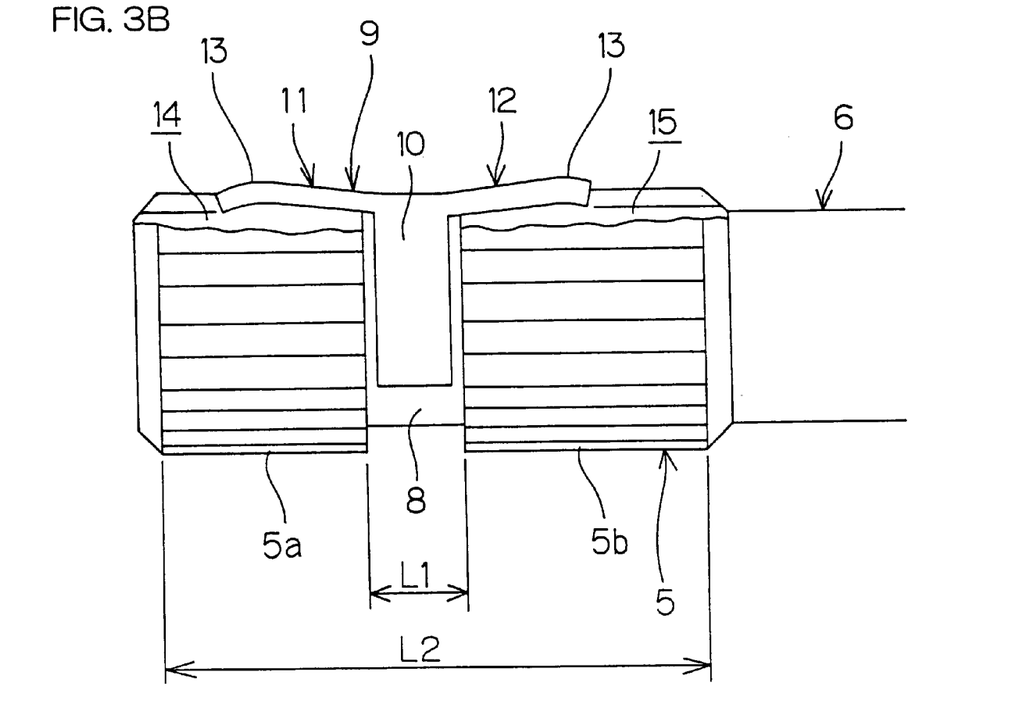

Referring to FIGS. 2, 3A and 3B, the anti-rattle member 9 includes a leg portion 10 serving as a single snap ring substantially of an annular form (C-shaped arcuate form) extending along a circumference of the thin shaft portion 8, and a pair of arms 11, 12 extended from an intermediate portion (a midportion, for example) of the leg portion 10 in axially opposite directions of the thin shaft portion 8.

Figure 4:
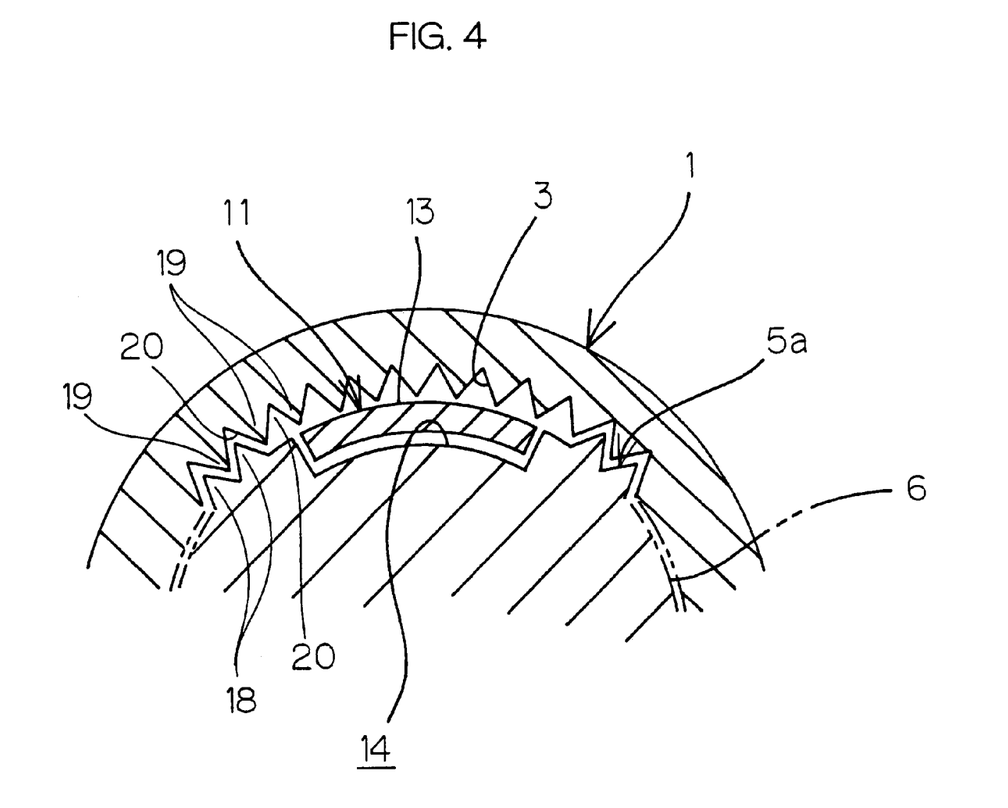
FIG. 4 is a sectional view showing the expansion shaft in which two shaft sections are assembled with an arm of the anti-rattle member pressing against a female serration.

The leg portion 10 extends substantially along the overall circumference of the thin shaft portion 8, resiliently clamping the thin shaft portion 8. Each of the arms 11, 12 is of a bent form, raised at its intermediate portion 13 such that the intermediate portion 13 may resiliently contact the female serration 3, as shown in FIG. 4, when the two shaft sections 1, 6 are assembled. As shown in FIGS. 1, 3A and 3B, the male serrations 5a, 5b are respectively formed with teeth-free areas 14, 15 for accommodating the corresponding arms 11, 12.

Referring to FIG. 4, each serration tooth 18 defines a ridge, the serration tooth extending axially of the male serration 5a and having a triangular shape in section. Each serration tooth 18 as the ridge of the male serration 5a is fitted in a groove 20 defined between adjoining serration teeth 19 of the female serration 3.

In the present embodiment, an axial length L1 of the thin shaft portion 8 (see FIG. 3B) can be reduced because a single leg portion 10 serves to retain the anti-rattle member 9 on the thin shaft portion 8 of the second shaft section 6. This contributes to a reduced fit length L2 between the serrations 3, 5 (see FIG. 3B) and hence, to the realization of a compact, lightweight expansion shaft. In addition, a sufficient anti-rattle effect can be attained by virtue of the pair of arms 11, 12 pressing against the female serration 3, the arms extended axially of the thin shaft portion 8 in a bent fashion.

During the assembly of the expansion shaft, in particular, the arms 11, 12 are accommodated in the corresponding teeth-free areas 14, 15 of the male serrations 5a, 5b so that the arms 11, 12 may not interfere with the assembly of the shaft sections. Thus, the assembly of the expansion shaft is facilitated.

Figure 5:
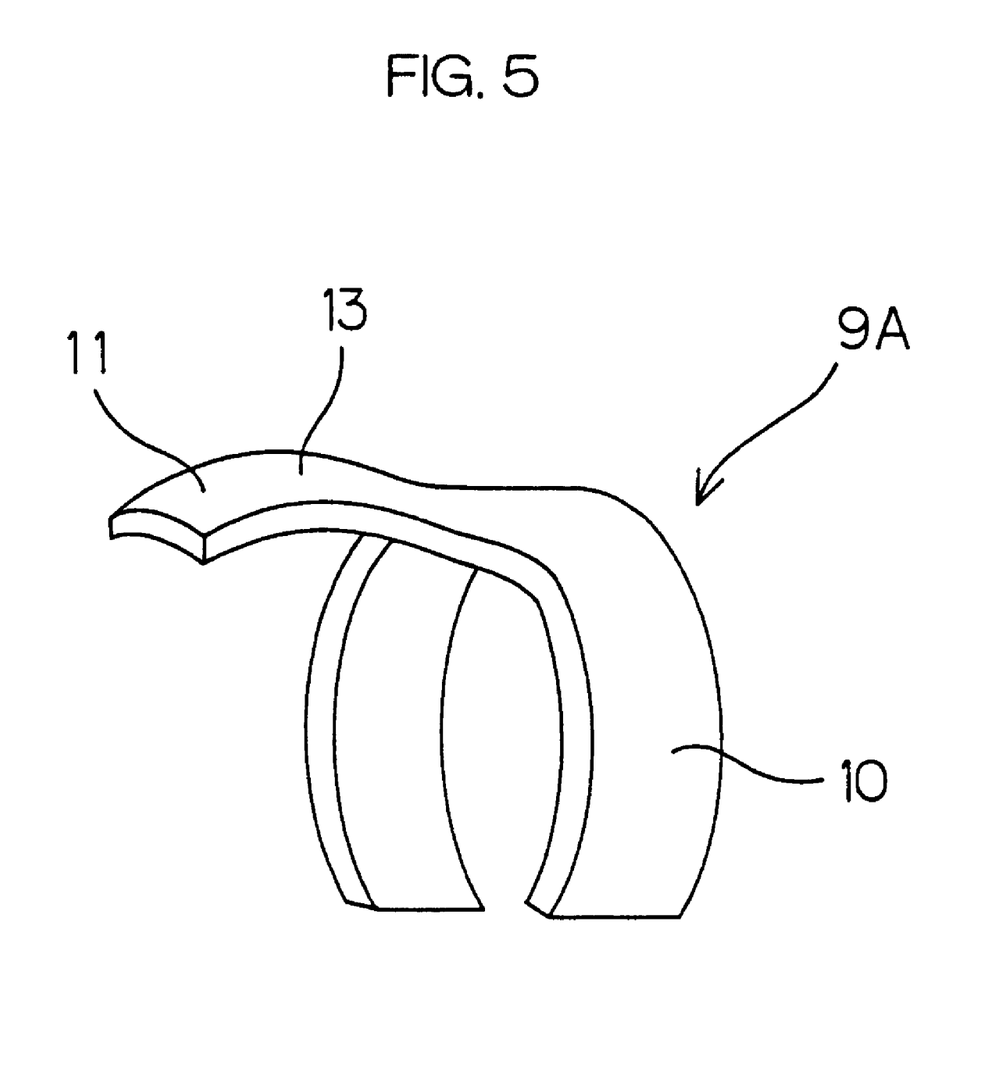
FIG. 5 is a perspective view showing an anti-rattle member according to another embodiment of the invention.

It is to be noted that the present invention should not be limited to the foregoing embodiment. As shown in FIG. 5, for instance, an anti-rattle member 9A may include either one of the arms 11, 12. Such a design requires only one teeth-free area, further reducing the production costs.

Figure 6:
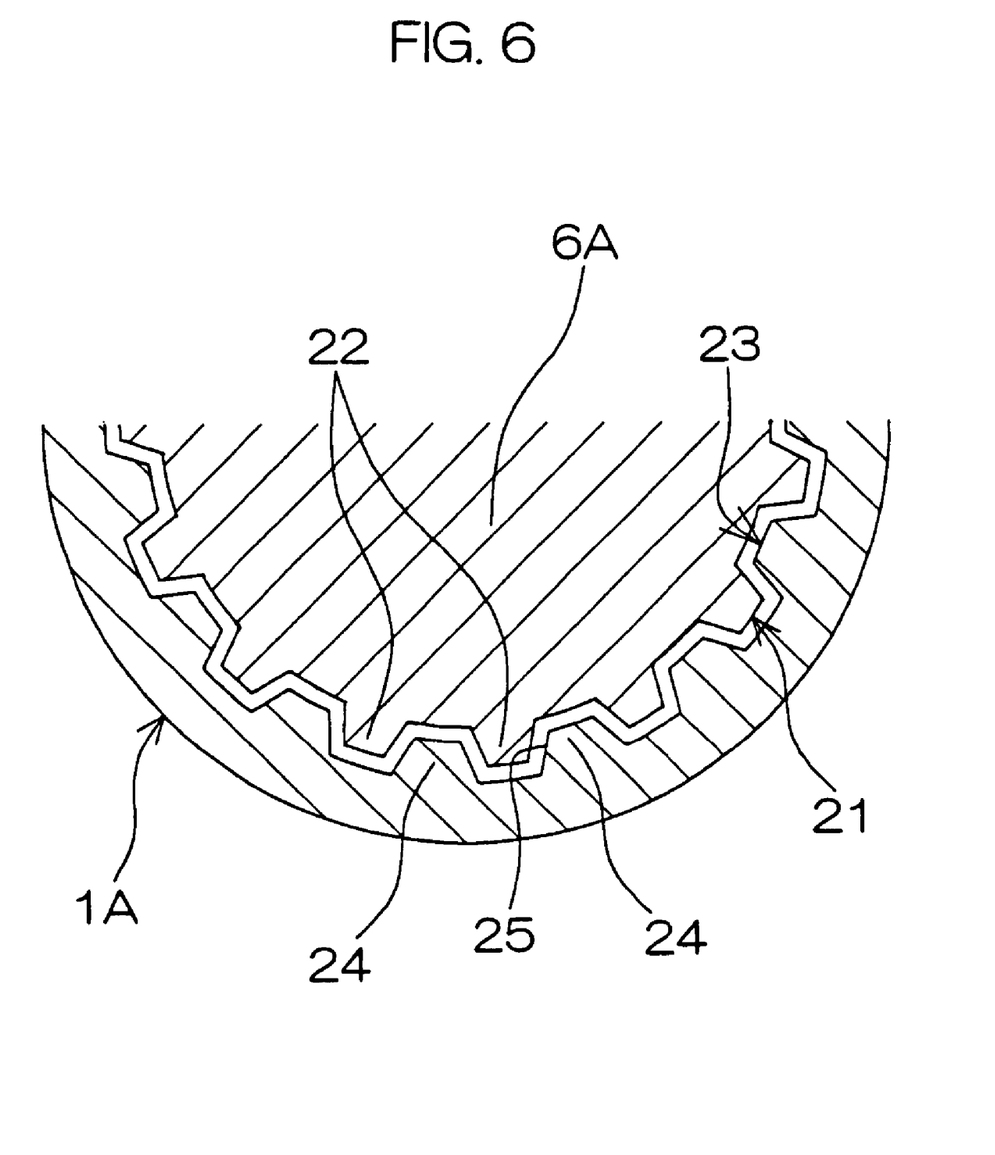
FIG. 6 is a sectional view showing an expansion shaft according to still another embodiment of the invention.

As shown in FIG. 6, a second shaft section 6A may comprise a spline shaft. In this case, each spline tooth 22 defines the ridge, the spline tooth extending on a male spline 21 of the second shaft section 6A and having a trapezoidal or groove-like shape in section. On the other hand, a groove 25 is defined between adjoining spline teeth 24 of a female spline 23 of a first shaft section 1A.

Figure 7A:
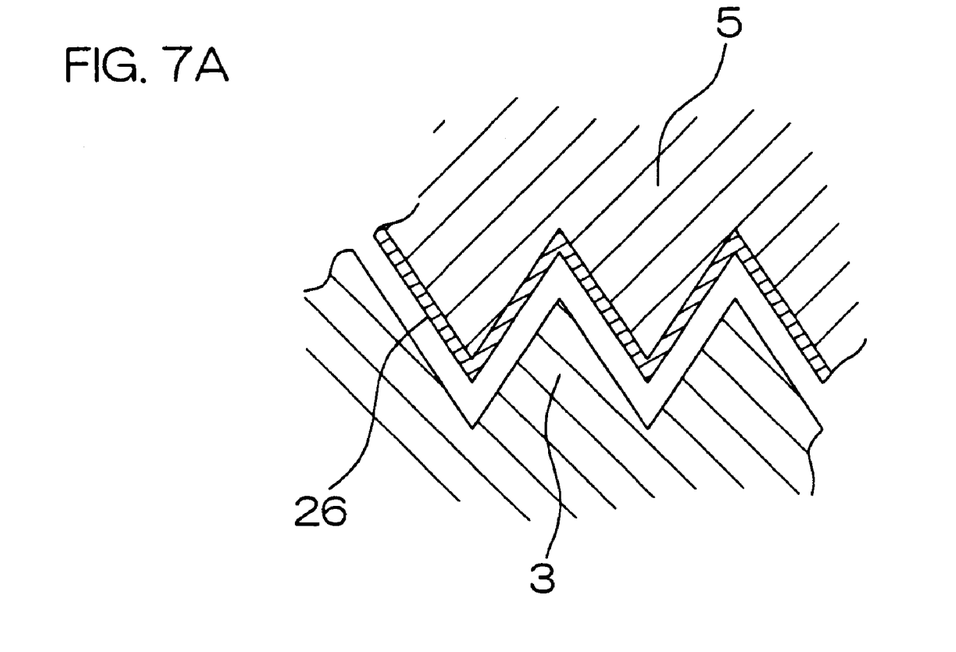
FIGS. 7A and 7B are sectional views showing an expansion shaft according to yet another embodiment of the invention.

Further, as shown in FIG. 7A, the male serration 5 may be coated with a synthetic resin of low friction coefficient such as fluoroplastics to provide a coating film 26.

In this case, the synthetic-resin coating film 26 serves to reduce sliding resistance between the serrations 3, 5. Particularly, quite a great anti-rattle effect can be attained at low costs because the synthetic-resin coating film 26 not only serves to reduce the clearance between the serrations 3, 5 but also cooperates with the anti-rattle member 9 to prevent the occurrence of rattle. The reasons for this are the following.

If the prevention of rattle depends only on the synthetic-resin coating film adjusting the clearance between the serrations 3, 5, a highly severe control of the thickness of the synthetic-resin coating film is required. Considering the variations of the dimensional tolerances of individual serrations 3, 5, an operation is required for selectively combining individual serrations 3, 5 that can achieve a desired clearance. This approach is not practicable given the number of steps required for this operation and the associated cost increase. In contrast, the embodiment of FIG. 7A negates the need for the severe control of the thickness of the synthetic-resin coating film 26, contributing the low-cost production. Thus, the reduction of sliding resistance and the prevention of rattle can be attained at low costs.

Figure 7B:
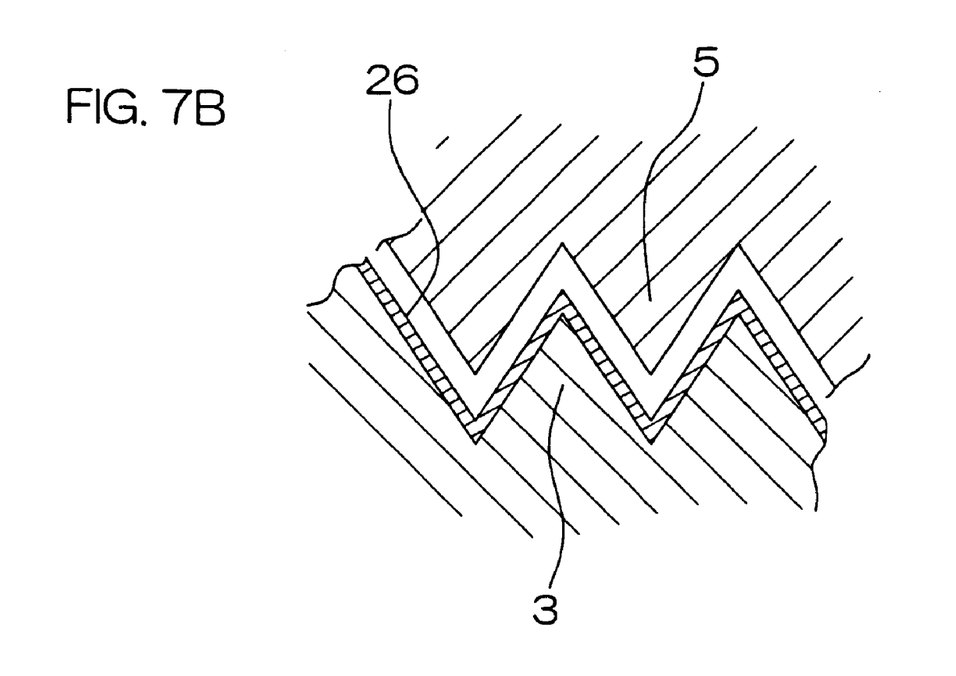

It is noted that the synthetic-resin coating film 26 may be laid over the female serration 3, as shown in FIG. 7B. Other various changes and modifications may be made to the invention without departing from the spirit and scope thereof.

What is claimed is:

1. An expansion shaft comprising a first and a second shaft section aligned on the same axis, the expansion shaft further comprising:

a fit hole formed at the first shaft section for receiving the second shaft section;

a thin shaft portion defined on the second shaft section;

a pair of thick shaft portions formed on the second shaft section as axially sandwiching the thin shaft portion on the second shaft section therebetween;

a groove and a ridge respectively formed in an inner circumferential surface of the fit hole and on the thick shaft portions for coming into fitting engagement thereby integrally rotatably interconnecting the first and second shaft sections while allowing the shaft sections to axially move relative to each other; and a resilient member interposed between the inner circumferential surface of the fit hole of the first shaft section and an opposite outer peripheral surface of the second shaft section for preventing the shaft sections from radially moving relative to each other, wherein the resilient member includes only one C-shaped snap ring resiliently clamping the thin shaft portion, and at least one arm, said arm extended to a free end thereof, from the snap ring in an axial direction of the second shaft section and serving to press against the inner circumferential surface of the fit hole of the first shaft section.

2. An expanded shaft, comprising a first and a second shaft section aligned on the same axis, the expansion shaft further comprising:

a fit hole formed at the first shaft section for receiving the second shaft section;

a thin shaft portion defined on the second shaft section;

a pair of thick shaft portions formed on the second shaft section as axially sandwiching the thin shaft portion on the second shaft section therebetween;

a groove and a ridge respectively formed in an inner circumferential surface of the fit hole and on the thick shaft portions for coming into fitting engagement thereby integrally rotatably interconnecting the first and second shaft sections, while allowing the shaft sections to axially move relative to each other; and a resilient member interposed between the inner circumferential surface of the fit hole of the first shaft section and an opposite outer peripheral surface of the second shaft section for preventing the shaft sections from radially moving relative to each other, wherein the resilient member includes a single C-shaped snap ring resiliently clamping the thin shaft portion, and an arm extended from the snap ring in at least one axial direction of the second shaft section and serving to press against the inner circumferential surface of the fit hole of the first shaft section, and wherein at least one of the thick shaft portions of the second shaft section includes for each said arm a corresponding ridge-free area accommodating said arm.

3. The expansion shaft as claimed in claim 2, wherein the ridge-free area is continuous to the thin shaft portion.

4. The expansion shaft as claimed in claim 1, wherein the second shaft section includes a spline shaft.

5. The expansion shaft as claimed in claim 1, wherein the second shaft section includes a serration shaft.

6. The expansion shaft as claimed in claim 1, wherein a synthetic-resin layer is interposed between the ridge and groove.

7. The expansion shaft as claimed in claim 6, wherein the synthetic-resin layer is laid over a region at least including the thick shaft portions of the second shaft section.

8. The expansion shaft as claimed in claim 6, wherein the synthetic-resin layer is laid over a region at least including the groove in the inner circumferential surface of the fit hole.

9. The expansion shaft as claimed in claim 1, wherein the resilient member includes sheet metal formed by press forming.

10. The expansion shaft as claimed in claim 2, wherein the second shaft section includes a spline shaft.

11. The expansion shaft as claimed in claim 2, wherein the second shaft section includes a serration shaft.

12. The expansion shaft as claimed in claim 2, wherein a synthetic-resin layer is interposed between the ridge and groove.

13. The expansion shaft as claimed in claim 12, wherein the synthetic-resin layer is laid over a region at least including the thick shaft portions of the second shaft section.

14. The expansion shaft as claimed in claim 12, wherein the synthetic-resin layer is laid over a region at least including the groove in the inner circumferential surface of the bit hole.

15. The expansion shaft as claimed in claim 2, wherein the resilient member includes sheet metal formed by press forming.

16. The expansion shaft as claimed in claim 1, wherein the at least one arm includes first and second arms extending from the snap ring to respective free ends in opposite first and second axial directions of the second shaft section.

17. The expansion shaft as claimed in claim 1, wherein the at least one arm includes only one arm.

18. The expansion shaft as claimed in claim 1, wherein only said one C-shaped snap ring is fitted on the thin shaft portion between opposing side surfaces of the pair of thick shaft portions, so that the opposing side surfaces directly confront opposite side edges of said one C-shaped snap ring so as to sandwich only said one C-shaped snap ring therebetween.

* * * * *